US010949498B1

United States Patent
Enumula et al.

(10) Patent No.: US 10,949,498 B1
(45) Date of Patent: Mar. 16, 2021

(54) SOFTMAX CIRCUIT (71) Applicant: Xilinx, Inc., San Jose, CA (US)

(72) Inventors: Vijay Kumar Reddy Enumula, Hyderabad (IN); Sundeep Ram Gopal Agarwal, Hyderabad (IN)

(73) Assignee: XLNX, INC., San Jose, CA (US)

( * ) Notice: Subject to any disclaimer, the term of this patent is extended or adjusted under 35 U.S.C. 154(b) by 217 days.

(21) Appl. No.: 16/352,764

(22) Filed: Mar. 13, 2019

(51) Int. Cl.
  *G06F 17/16* (2006.01)
  *G06F 7/556* (2006.01)
  *G06N 3/04* (2006.01)

(52) U.S. Cl.
  CPC .............. *G06F 17/16* (2013.01); *G06F 7/556* (2013.01); *G06N 3/04* (2013.01)

(58) Field of Classification Search
  CPC ........... G06F 7/556; G06F 17/16; G06N 3/04; G06N 3/06
  See application file for complete search history.

(56) References Cited

PUBLICATIONS

Z. Li, H. Li, X. Jiang, B. Chen, Y. Zhang and G. Du, "Efficient FPGA Implementation of Softmax Function for DNN Applications," 2018 12th IEEE International Conference on Anti-counterfeiting, Security, and Identification (ASID), Xiamen, China, 2018, pp. 212-216, doi: 10.1109/ICASID.2018.8693206. (Year: 2018).*
Geng, Xue, et al. "Hardware-Aware Softmax Approximation for Deep Neural Networks." SpringerLink, Springer, Cham, Dec. 2, 2018, link.springer.com/chapter/10.1007/978-3-030-20870-7_7. (Year: 2018).*
Muthuramalingam, A., et al. "Neural Network Implementation Using FPGA: Issues and Application." International Journal of Electrical and Computer Engineering, Dec. 22, 2008, publications.waset.org/15106/neural-network-implementation-using-fpga-issues-and-application. (Year: 2008).*
I. Kouretas and V. Paliouras, "Simplified Hardware Implementation of the Softmax Activation Function," 2019 8th International Conference on Modern Circuits and Systems Technologies (MOCAST), Thessaloniki, Greece, 2019, pp. 1-4, doi: 10.1109/MOCAST.2019.8741677. (Year: 2019).*

(Continued)

*Primary Examiner* — Andrew Caldwell
*Assistant Examiner* — Huy Duong
(74) *Attorney, Agent, or Firm* — Crawford Maunu PLLC (57) ABSTRACT

Disclosed approaches for circuitry that implements a softmax function include difference calculation circuitry configured to calculate differences between combinations of elements, $z_k-z_j$, of a vector. First lookup circuitry is configured to lookup and output representations of exponential values, $e^{z_k-z_j}$, associated with the differences in response to input of the differences. Each adder circuit of N adder circuits sums a subset of the exponential values output from the first lookup circuitry and a value of 1. The sum output by each adder circuit denotes a denominator of a plurality of denominators of the softmax function. Second lookup circuitry is configured with quotients and looks-up and outputs quotients associated with the plurality of denominators as results of the softmax function.

20 Claims, 4 Drawing Sheets (56) References Cited

PUBLICATIONS

Zihao Yuan University of Southern California, et al. "Softmax Regression Design for Stochastic Computing Based Deep Convolutional Neural Networks." Softmax Regression Design for Stochastic Computing Based Deep Convolutional Neural Networks | Proceedings of the on Great Lakes Symposium on VLSI 2017 (Year: 2017).*

Machmach 1, et al. "Softmax vs Sigmoid Function in Logistic Classifier?" Cross Validated, Oct. 1, 1965, stats.stackexchange.com/questions/233658/softmax-vs-sigmoid-function-in-logistic-classifier. (Year: 2017).*

Oshana, Robert. "Floating Point Number." Floating Point Number—an Overview | ScienceDirect Topics, 2006, www.sciencedirect.com/topics/engineering/floating-point-number. (Year: 2006).*

Yuan, Efficient Hardware Architecture of Softmax Layer in Deep Neural Network, IEEE, 2016, http://ieeexplore.ieee.org/stamp/stampjsp?arnumber=7905501.

Igbinedion, Fast Softmax Sampling for Deep Neural Networks, Stanford reports, 2017, http://cs231n.stanford.edu/reports/2017/pdfs/130.pdf.

* cited by examiner

SOFTMAX CIRCUIT

TECHNICAL FIELD

The disclosure generally relates to neural networks.

BACKGROUND

The softmax function is often used as the activation function in the final layer of a neural network. A set of probabilities that sum to 1 is generated by the softmax function. Each probability indicates the likelihood that an input data set to the neural network belongs to a certain class.

Current implementations of the softmax function consume significant hardware resources, operate at an undesirably low frequency, and exhibit an undesirably high latency. Computing exponential components and performing multiple division operations of the softmax function is expensive in terms of hardware resources and processing cycles.

SUMMARY

A disclosed circuit arrangement includes difference calculation circuitry configured to calculate differences between combinations of elements, $z_k-z_j$, of a vector Z of length N for N≥2, 1≤j≤N, and 1≤k≤N. A first lookup circuitry is coupled to the difference calculation circuitry. The first lookup circuitry is configured to lookup and output representations of exponential values, $e^{z_k-z_j}$ associated with the differences in response to input of the differences. The variable e is the base of the natural logarithm. N adder circuits are coupled to the first lookup circuitry. Each adder circuit is configured to sum a subset of the exponential values output from the first lookup circuitry and a value of 1, and output a sum that denotes a denominator of a plurality of denominators of a softmax function. Second lookup circuitry is coupled to the N adder circuits, and the second lookup circuitry is configured with quotients and configured to lookup and output quotients associated with the plurality of denominators as results of the softmax function.

A disclosed method includes calculating by difference calculation circuitry differences between combinations of elements, $z_k-z_j$, of a vector Z of length N for N≥2, 1≤j≤N, and 1≤k≤N. First lookup circuitry involved in the method looks-up representations of exponential values, $e^{z_k-z_j}$ associated with the differences in response to input of the differences. The variable e is the base of the natural logarithm. The method has each adder circuit of N adder circuits summing a subset of the exponential values output from the first lookup circuitry and a value of 1. The output sum by each adder circuit denotes a denominator of a plurality of denominators of a softmax function. Second lookup circuitry involved in the method looks-up quotients associated with the plurality of denominators as results of the softmax function.

Other features will be recognized from consideration of the Detailed Description and Claims, which follow.

BRIEF DESCRIPTION OF THE DRAWINGS

Various aspects and features of the circuitry and methods will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The mathematical representation of the softmax function applied to an input vector $Z=[z_1, z_2, z_3, \ldots z_N]$, is:

$$\sigma(z_j) = e^{z_j} \Big/ \left(\sum_{k=1}^{N} e^{z_k}\right)$$

where $z_j$ is the $j^{th}$ input of an input vector Z, N is the number of elements in the input vector, and e is the base of the natural logarithm. The disclosed approaches enable high throughput, low latency, and a reduced number of hardware resources by eliminating the exponential and division computations of the softmax function.

The increase in throughput and reduction in latency and hardware resources is enabled by reducing the softmax function to:

$$\sigma(z_j) = 1 \Big/ \left(1 + \sum_{k=1}^{N} e^{z_k-z_j}\right)$$

The reduced softmax function still has exponential functions in the denominator. However, the value of exponent is the difference between two of the values of the input vector.

In accordance with the disclosed approaches, storage circuitry can be configured with pre-computed exponential values and quotients, and instead of calculating the exponential function and performing division, exponential values and quotients can be looked-up and read from the storage. In implementing the softmax function, the disclosed approaches achieve high throughput and low latency and reduce hardware requirements, while producing softmax results having accuracy comparable to computational implementations.

A circuit arrangement that computes the softmax function according to the disclosed approaches includes difference calculation circuitry. The difference calculation circuitry is configured to calculate differences between combinations of values, $z_k-z_j$, of a vector Z of length N. Instead of computing exponential values and performing division as in customary calculations of the softmax function, the disclosed circuit arrangement includes lookup circuitry. First lookup circuitry is configured to lookup and output representations of exponential values ($e^{z_k-z_j}$) that are associated with the differences provided by the difference calculation circuitry. Multiple (N) adder circuits are coupled to the first lookup circuitry. Each adder circuit sums a subset of the exponential values output from the first lookup circuitry and a value of 1, and outputs a sum that denotes a denominator of the transformed softmax function. Second lookup circuitry is coupled to the N adder circuits. The second lookup circuitry includes storage for quotients and is configured to lookup and output quotients associated with the denominators from the adder circuits. The collective outputs of the second lookup circuitry are the results of the softmax function.

Figure 1:
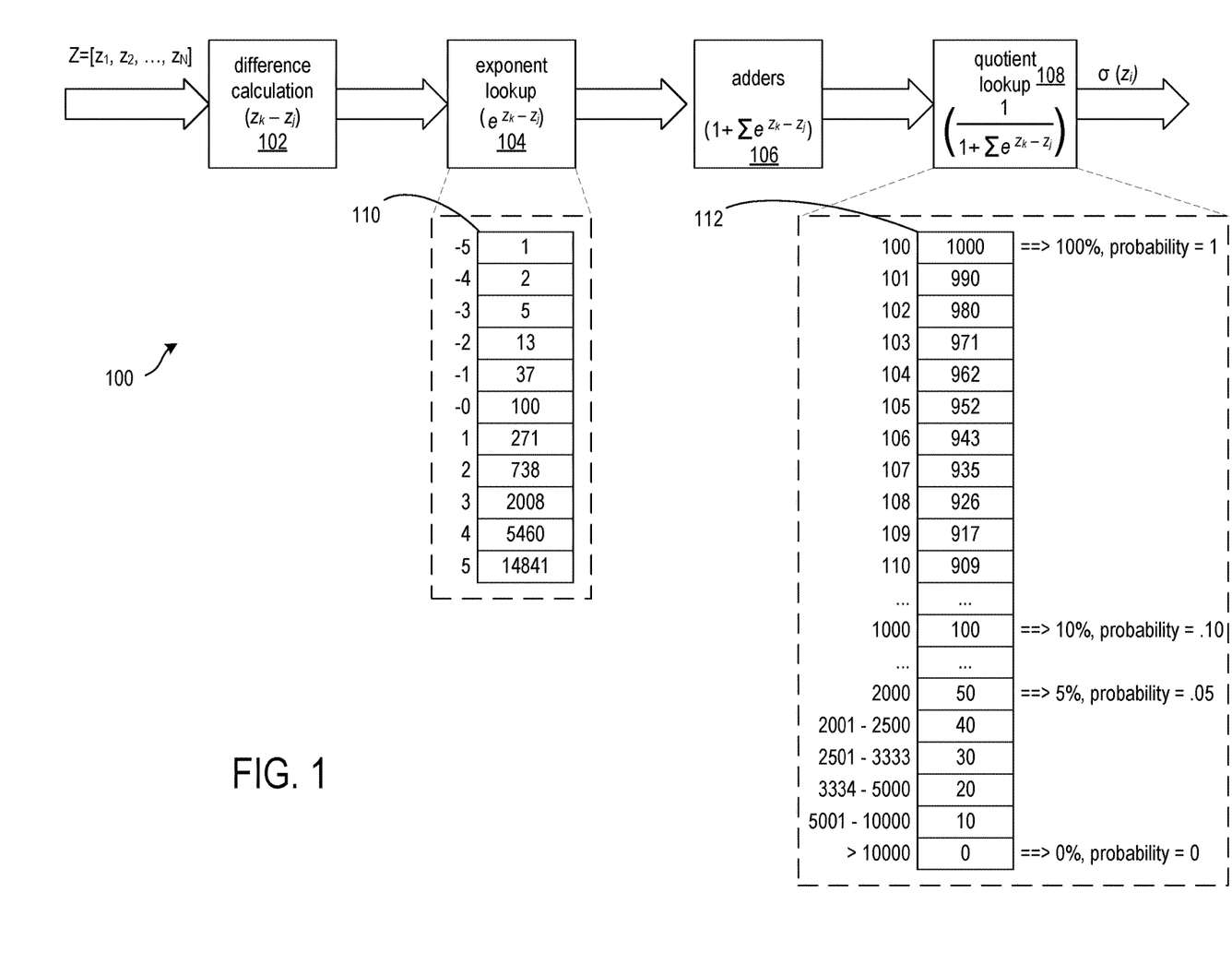
FIG. 1 shows a circuit arrangement that performs the softmax function in accordance with the disclosed approaches.

FIG. 1 shows a circuit arrangement 100 that performs the softmax function in accordance with the disclosed approaches. The circuit arrangement includes difference calculation circuitry 102, exponent lookup circuitry 104, adder circuits 106, and quotient lookup circuitry 108. As indicated above, the softmax function is transformed for ease of computation, and the transformed function can be implemented with two lookups in combination with the subtractions and additions. One lookup provides the value of $e^{z_k-z_j}$, and the other lookup substitutes for the division.

The difference calculation circuitry inputs a vector Z having vector elements $z_1, z_2, z_3, \ldots z_N$. For each possible pairing of vector elements, the difference calculation circuitry computes the difference. That is, the difference calculation circuitry computes $z_k-z_j$, for values of j and k between 1 and N ($1 \le j \le N$ and $1 \le k \le N$). The difference calculation circuitry outputs N*(N-1) values (the differences), and the exponent lookup circuitry 104 inputs the differences.

The exponent lookup circuitry 104 looks up and outputs N*(N-1) values of $e^{z_k-z_j}$, based on the differences of $z_k-z_j$, input from the difference calculation circuitry 102. Table 110 is an example of a lookup table of the exponent lookup circuitry 104 having pre-computed values of $e^{z_k-z_j}$. The lookup table can be implemented by an addressable RAM or an arrangement of registers with suitable addressing circuitry.

For values of $z_k-z_j$ that are greater than 5, it has been recognized that the denominator of the transformed softmax function becomes very large and the result of the division operation approaches 0. Similarly, for values of $z_k-z_j$ that are less than −5, the denominator becomes very small and the result of the division operation approaches 1. Thus, the pre-computed exponential values ($e^z$, where $z=z_k-z_j$) are limited to $e^{-5}$ to $e^5$.

To reduce hardware requirements while maintaining precision to two decimal places, the pre-computed values stored in the lookup table 110 are the exponential values multiplied by 100 (i.e., $100e^z$). The values stored in the lookup table allow downstream integer arithmetic operations instead of costly floating point operations.

The adder circuits 106 input disjoint subsets of the set of values output by the exponent lookup circuitry 104. Each adder circuit sums the input values and adds one to that result. The subset of values input to an adder circuit are those output by the exponent lookup circuitry 104 and resulting from the same subtrahend (same value of j in $e^{z_k-z_j}$). The outputs of the adder circuits are N values of:

$$1 + \sum_{k=1}^{N} e^{z_k-z_j},$$

each of which is a denominator of the transformed softmax function and input to the quotient lookup circuitry 108.

The quotient lookup circuitry 108 looks-up and outputs the quotients associated with the input denominators from the adder circuits 106. The table 112 is an example of a lookup table of the quotient lookup circuitry 108 having pre-computed quotients of $$1 \bigg/ \left(1 + \sum_{k=1}^{N} e^{z_k-z_j}\right).$$

The quotients in the lookup table are addressed based on the value of the input denominator. The lookup table can be implemented by an addressable RAM or an arrangement of registers with suitable addressing circuitry.

The values of the quotients stored in the table 112 reflect scaling of the softmax function in order to support the integer-based softmax function while capturing decimal results of the division operation. The scaling involves multiplying the numerator and denominator by 100, and further multiplying the numerator by 1000. That is, the transformed and scaled softmax function is:

$$100 * 1000 \bigg/ \left(100 * \left(1 + \sum_{k=1}^{N} e^{z_k-z_j}\right)\right)$$

The lookup table 112 stores quotients that correspond to and are associated with a range of values of denominators (range of $$100 * \left(1 + \sum_{k=1}^{N} e^{z_k-z_j}\right)).$$

In the example, denominators range in value from 100 to 10000. In order to reduce storage requirements of lookup table, lower values of the quotients are associated with sub-ranges of values of the denominator. In the example lookup table 112, the quotient having value 40 corresponds to denominators in the sub-range of 2001-2500; the quotient having value 30 corresponds to denominators in the sub-range of 2501-3333; the quotient having value 20 corresponds to denominators in the sub-range of 3334-5000; the quotient having value 10 corresponds to denominators in the sub-range of 5001-10,000; and the quotient having value 0 corresponds to denominators greater than 10,000. Quotients having values 50-1000 are associated with discrete denominators from 2000 down to 100, respectively.

The values of the quotients in the lookup table 112 can be interpreted as a percentage confidence level or as a probability between 0 and 1. By moving the decimal one place to the left, the value of a quotient indicates a percentage confidence level, and moving the decimal three places to the left, the value of a quotient indicates a probability. For example, the quotient having a value 971 indicates a confidence level of 97.1% and a probability of 0.971.

Figure 2:
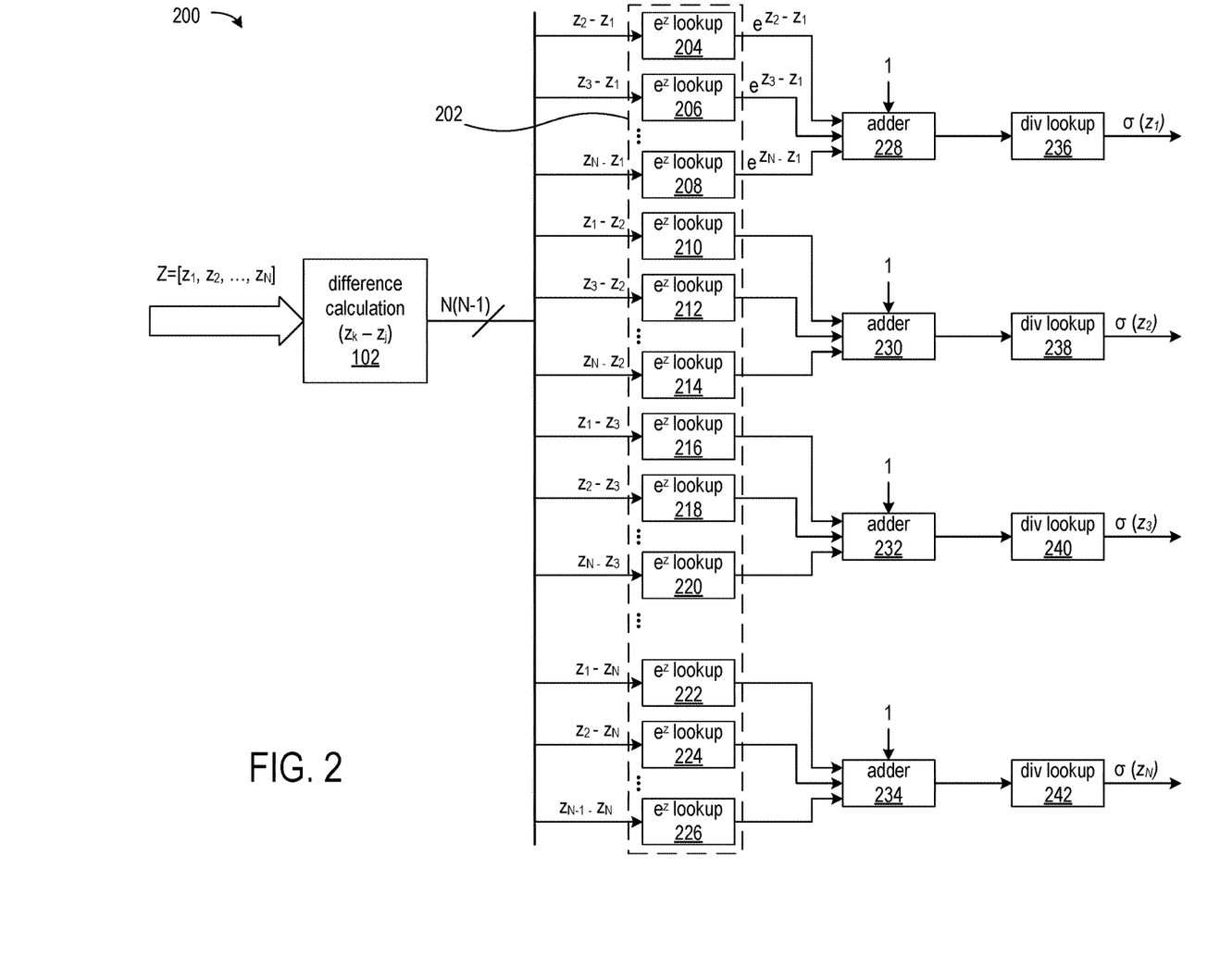
FIG. 2 shows a circuit arrangement that performs the transformed softmax function in accordance with the disclosed approaches.

FIG. 2 shows a circuit arrangement 200 that performs the transformed softmax function in accordance with the disclosed approaches. The difference calculation circuitry 102 includes N*(N-1) subtraction circuits, and each of the subtraction circuits computes the difference between one of the pairs of possible combinations of $z_k-z_j$, for the input vector Z having vector elements $z_1, z_2, z_3, \ldots z_N$. The vector elements $z_1, z_2, z_3, \ldots z_N$ can be input in parallel to the subtraction circuits.

The N*(N−1) subtraction circuits output N*(N−1) differences to N*(N−1), $e^z$ lookup circuits 202. Each $e^z$ lookup circuit inputs a respective one of the differences and looks-up the exponential value associated with the difference. Each $e^z$ lookup circuit can have a dedicated instance of the lookup table 110 (FIG. 1), allowing parallel operation of the N*(N−1), $e^z$ lookup circuits. The instances of the lookup table memory circuit are configured with the same set of representations of the exponential values. The input difference is used to address an entry in the lookup table.

The $e^z$ lookup circuit 204 inputs the difference of $z_2-z_1$, and that difference addresses the lookup table to obtain the value $e^{z_2-z_1}$; the $e^z$ lookup circuit 206 inputs the difference of $z_3-z_1$, and that difference addresses the lookup table to obtain the value $e^{z_3-z_1}, \ldots$; the $e^z$ lookup circuit 208 inputs the difference of $z_N-z_1$, and that difference addresses the lookup table to obtain the value $e^{z_N-z_1}$; the $e^z$ lookup circuit 210 inputs the difference of $z_1-z_2$, and that difference addresses the lookup table to obtain the value $e^{z_1-z_2}$; the $e^z$ lookup circuit 212 inputs the difference of $z_3-z_2$, and that difference addresses the lookup table to obtain the value $e^{z_3-z_2}, \ldots$; the $e^z$ lookup circuit 214 inputs the difference of $z_N-z_2$, and that difference addresses the lookup table to obtain the value $e^{z_N-z_2}$; the $e^z$ lookup circuit 216 inputs the difference of $z_1-z_3$, and that difference addresses the lookup table to obtain the value $e^{z_1-z_3}$; the $e^z$ lookup circuit 218 inputs the difference of $z_2-z_3$, and that difference addresses the lookup table to obtain the value $e^{z_2-z_3}, \ldots$; the $e^z$ lookup circuit 220 inputs the difference of $z_N-z_3$, and that difference addresses the lookup table to obtain the value $e^{z_N-z_3}, \ldots$; the $e^z$ lookup circuit 222 inputs the difference of $z_1-z_N$, and that difference addresses the lookup table to obtain the value $e^{z_1-z_N}$; the $e^z$ lookup circuit 224 inputs the difference of $z_2-z_N$, and that difference addresses the lookup table to obtain the value $e^{z_2-z_N}, \ldots$; and the $e^z$ lookup circuit 204 inputs the difference of $z_{N-1}-z_N$, and that difference addresses the lookup table to obtain the value $e^{z_{N-1}-z_N}$.

As the lookup table 110 has exponential values associated with negative values of $z_k-z_j$, the differences output by the difference calculation circuit 102 can be adjusted by the $e^z$ lookup circuits 202 such that the difference −5 is adjusted to reference address 0 of the lookup table, the difference −4 is adjusted to reference address 1 of the lookup table, etc.

The exponential values output by the $e^z$ lookup circuits 202 are input to the N adder circuits 228, 230, 232, ..., 234. Each adder circuit inputs a respective subset of the exponential values, sums the exponential values, and adds 1 to the sum. The respective subset of the exponential values input by an adder circuit are those exponential values resulting from the same subtrahend in $z_k-z_j$. For example, adder circuit 228 inputs the exponential values resulting from the subtrahend $z_1$, adder circuit 230 inputs the exponential values resulting from the subtrahend $z_2$, etc.

Each adder circuit outputs to one of N division lookup circuits 236, 238, 240, ..., 242, a value of $$1 + \sum_{k=1}^{N} e^{z_k-z_j},$$

for one of the values of j ($1 \le j \le N$). Each of the division lookup circuits can include an instance of the quotients lookup table 112 (FIG. 1), and each lookup table can be addressed based on the output from the connected one of the adder circuits. The instances of the quotients lookup table memory circuits are configured with the same set of representations of the quotients. The division lookup circuits can include circuitry that translates input differences to values that can address the lookup table.

The division lookup circuits 236, 238 240, ..., 242 looks up quotients associated with and in response to the values provided by adder circuits 228, 230, 232, ..., 234, respectively. The output of each division lookup circuit is one of the values ($\sigma(z_j)$) of the transformed softmax function $$\sigma(z_j) = 1 \Big/ \left(1 + \sum_{k=1}^{N} e^{z_k-z_j}\right)$$

for one of the values of j ($1 \le j \le N$). For example, division lookup circuit 236 looks-up and outputs $\sigma(z_1)$, division lookup circuit 238 looks-up and outputs $\sigma(z_2)$, division lookup circuit 240 looks-up and outputs $\sigma(z_3)$, ..., and division lookup circuit 242 looks-up and outputs $\sigma(z_N)$.

Figure 3:
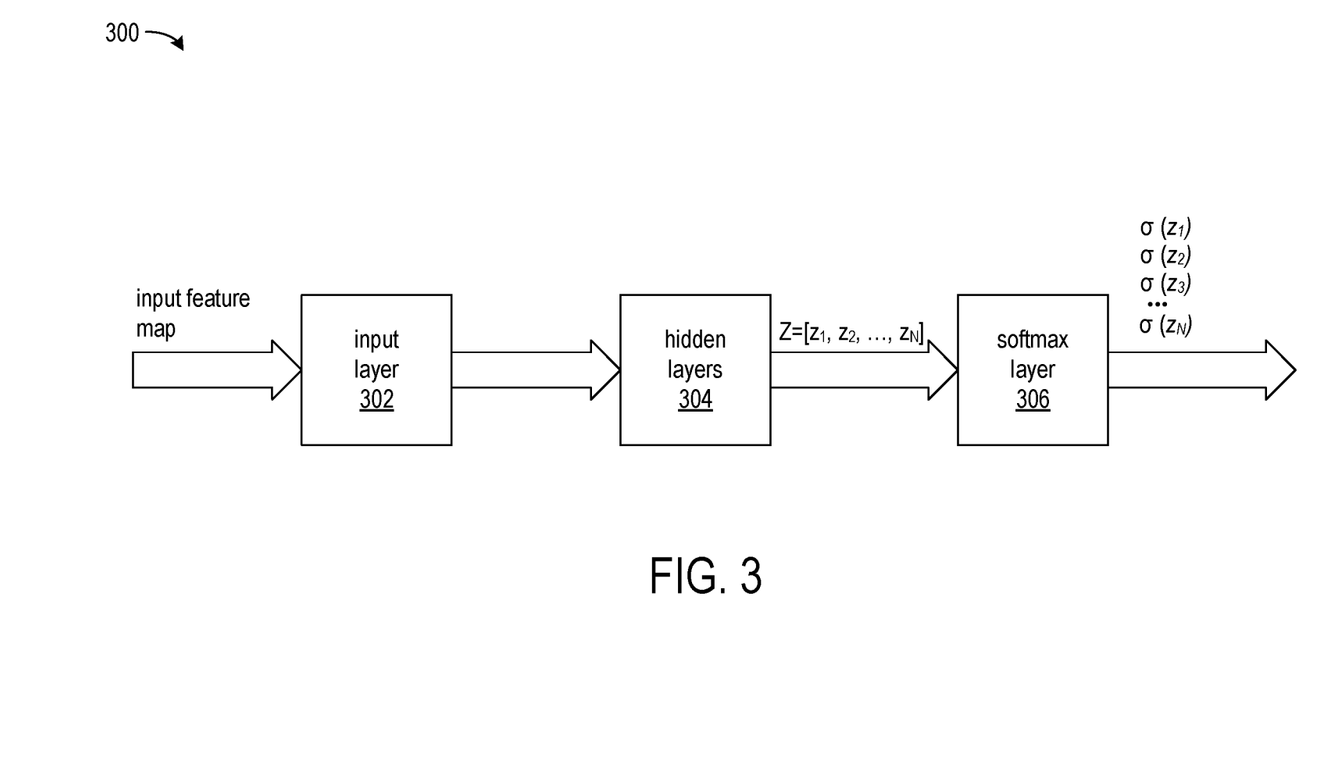
FIG. 3 shows an exemplary neural network in which the disclosed softmax circuitry can be employed.

FIG. 3 shows an exemplary neural network 300 in which the disclosed softmax circuitry can be employed. The neural network includes an input layer 302, hidden layers 304, and a softmax layer 306. The functions of the different layers can be implemented on combinations of one or more of a processor (e.g., central processing unit, graphics processing unit, etc.), programmable logic circuitry, or application specific integrated circuitry.

The data input to the input layer can be an input feature map. The input layer performs any needed normalization, selection, or ordering of data from the input feature map for processing by the hidden layers.

The hidden layers can include a series of one or more layers of processing, and the function of each layer relates to a particular characteristic that the neural network is attempting to determine whether or not the input data exhibits. The output of one layer is the input to the next layer in the series. Each hidden layer applies a function to the input data. The particular function depends on the application of the neural network, and the functions frequently include a linear transformation of the data from the previous layer and a squashing function to introduce non-linearity.

The last of the hidden layers provides the vector Z for input to the softmax layer 306, which can be implemented using the approaches shown in FIGS. 1 and 2 and described above.

Figure 4:
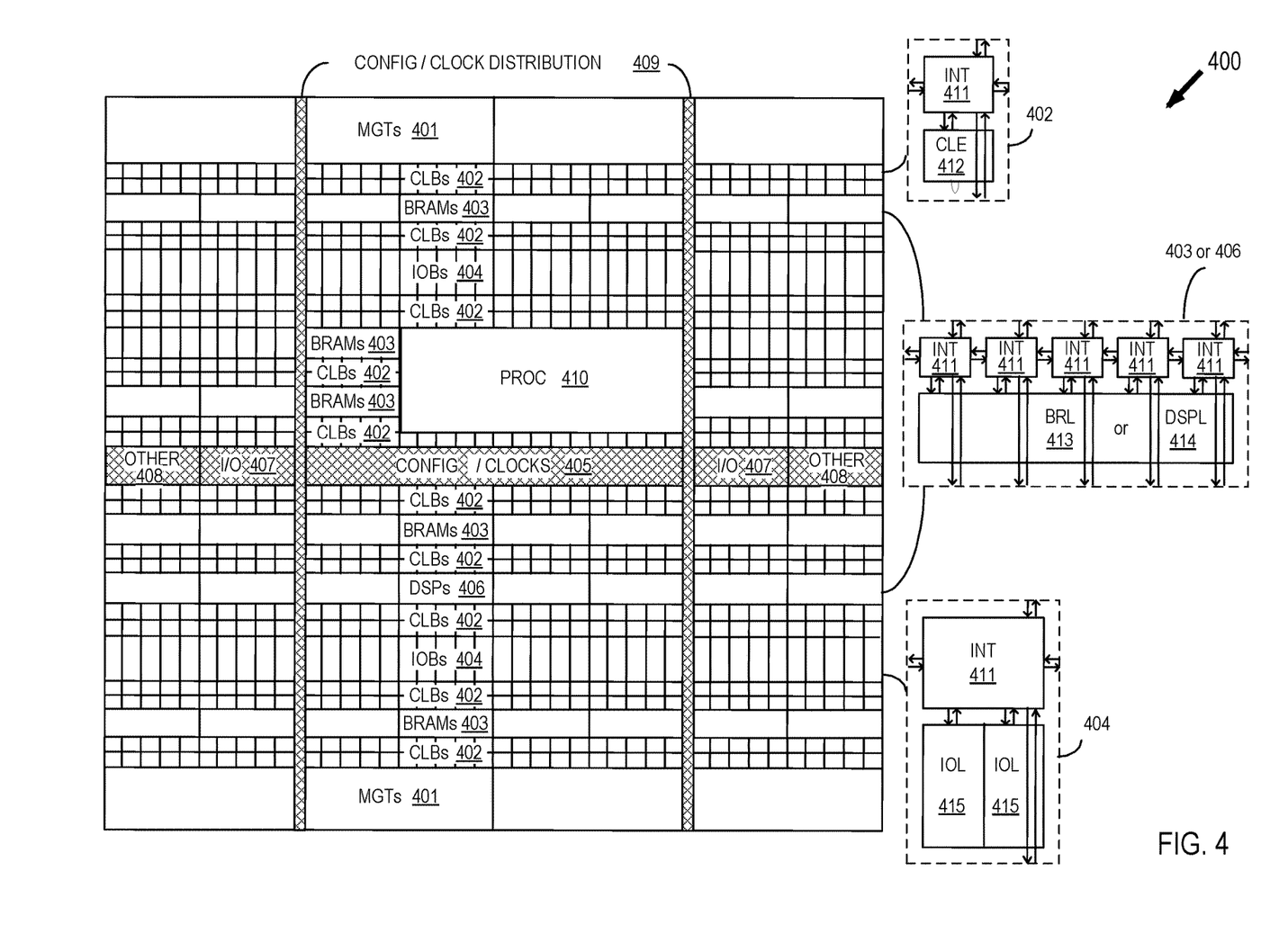
FIG. 4 shows a programmable integrated circuit (IC) on which the disclosed circuits and processes can be implemented.

FIG. 4 shows a programmable integrated circuit (IC) 400 on which the disclosed circuits and processes can be implemented. The programmable IC may also be referred to as a System On Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic

408 such as digital clock managers, analog-to-digital converters, system monitoring logic, and so forth. Some programmable IC having FPGA logic also include dedicated processor blocks (PROC) 410 and internal and external reconfiguration ports (not shown).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

A columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Some implementations are directed to a computer program product (e.g., nonvolatile memory device), which includes a machine or computer-readable medium having stored thereon instructions which may be executed by a computer (or other electronic device) to perform these operations/activities.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems that implement neural networks. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
    difference calculation circuitry configured to calculate differences between combinations of elements, $z_k - z_j$, of a vector Z of length N for $N \geq 2$, $1 \leq j \leq N$, and $1 \leq k \leq N$;
    first lookup circuitry coupled to the difference calculation circuitry, the first lookup circuitry configured to lookup and output representations of exponential values, $e^{z_k - z_j}$ associated with the differences in response to input of the differences, wherein e is the base of the natural logarithm;
    N adder circuits coupled to the first lookup circuitry, wherein each adder circuit is configured to sum a subset of the exponential values output from the first lookup circuitry and a value of 1, and output a sum that denotes a denominator of a plurality of denominators of a softmax function; and
    second lookup circuitry coupled to the N adder circuits, the second lookup circuitry configured with quotients and configured to lookup and output quotients associated with the plurality of denominators as results of the softmax function.

2. The circuit arrangement of claim 1, wherein the difference calculation circuitry includes N*(N−1) subtraction circuits.

3. The circuit arrangement of claim 1, wherein the first lookup circuitry includes N*(N−1) instances of a memory circuit, and the instances of the memory circuit are configured with equal sets of representations of the exponential values.

4. The circuit arrangement of claim 3, wherein the representations of the exponential values are integers.

5. The circuit arrangement of claim 4, wherein each set of representations of the exponential values only includes values that represent values ranging from $e^{-5}$ to $e^5$.

6. The circuit arrangement of claim 1, wherein the second lookup circuitry includes N instances of a memory circuit configured with equal sets of representations of the quotients.

7. The circuit arrangement of claim 6, wherein the representations of the quotients are integers.

8. The circuit arrangement of claim 7, wherein each set of representations of the quotients includes at least one representation of one of the quotients that is associated with a range of values of the plurality of denominators.

9. The circuit arrangement of claim 7, wherein each set of representations of the quotients includes respective representations of quotients associated with denominators having values from 100 to 2000, and includes respective quotients associated with a plurality of ranges of values from 2001 to 10,000 of denominators.

10. The circuit arrangement of claim 1, further comprising:
input circuitry that implements an input layer of a neural network; and
processing circuitry that implements hidden layers of the neural network, wherein the processing circuitry is coupled to the difference calculation circuitry and is configured to output values of elements of the vector Z.

11. A method comprising:
calculating by difference calculation circuitry differences between combinations of elements, $z_k-z_j$, of a vector Z of length N for N≥2, 1≤j≤N, and 1≤k≤N;
looking-up by first lookup circuitry representations of exponential values, $e^{z_k-z_j}$ associated with the differences in response to input of the differences, wherein e is the base of the natural logarithm;
summing by each adder circuit of N adder circuits, a subset of the exponential values output from the first lookup circuitry and a value of 1, wherein an output sum by each adder circuit denotes a denominator of a plurality of denominators of a softmax function; and
looking-up by second lookup circuitry quotients associated with the plurality of denominators as results of the softmax function.

12. The method of claim 11, wherein the calculating by the difference calculation circuitry difference calculation circuitry includes calculating the differences by N*(N−1) subtraction circuits.

13. The method of claim 11, wherein the looking-up by the first lookup circuitry includes looking-up the representations of exponential values by N*(N−1) instances of a memory circuit.

14. The method of claim 13, wherein the looking-up by the first lookup circuitry includes looking-up integer representations of the exponential values.

15. The method of claim 14, wherein the looking-up by the first lookup circuitry includes looking-up representations of the exponential values limited to a range of $e^{-5}$ to $e^5$.

16. The method of claim 11, wherein the looking-up by the second lookup circuitry includes looking-up the quotients in N instances of a memory circuit configured with equal sets of representations of the quotients.

17. The method of claim 16, wherein the looking-up by second lookup circuitry includes looking-up integer representations of the quotients.

18. The method of claim 17, wherein the looking-up by the second lookup circuitry includes looking-up in at least one of representations of the quotients a representation of one of the quotients that is associated with a range of values of the plurality of denominators.

19. The method of claim 17, wherein the looking-up by the second lookup circuitry includes looking-up in in each set of representations of the quotients that includes respective representations of quotients associated with denominators having values from 100 to 2000, and includes respective quotients associated with a plurality of ranges of values from 2001 to 10,000 of denominators.

20. The method of claim 11, further comprising:
providing input data to input circuitry of an input layer of a neural network;
processing the input data by circuitry that implements hidden layers of the neural network; and
providing the elements of the vector Z from the circuitry that implements the hidden layers to the difference calculation circuitry.

* * * * *